Sept. 2, 1941.    J. F. SNYDER    2,254,786
AUTOMATIC SAFETY BRAKE FOR BABY CARRIAGES
Filed April 5, 1941    2 Sheets-Sheet 1
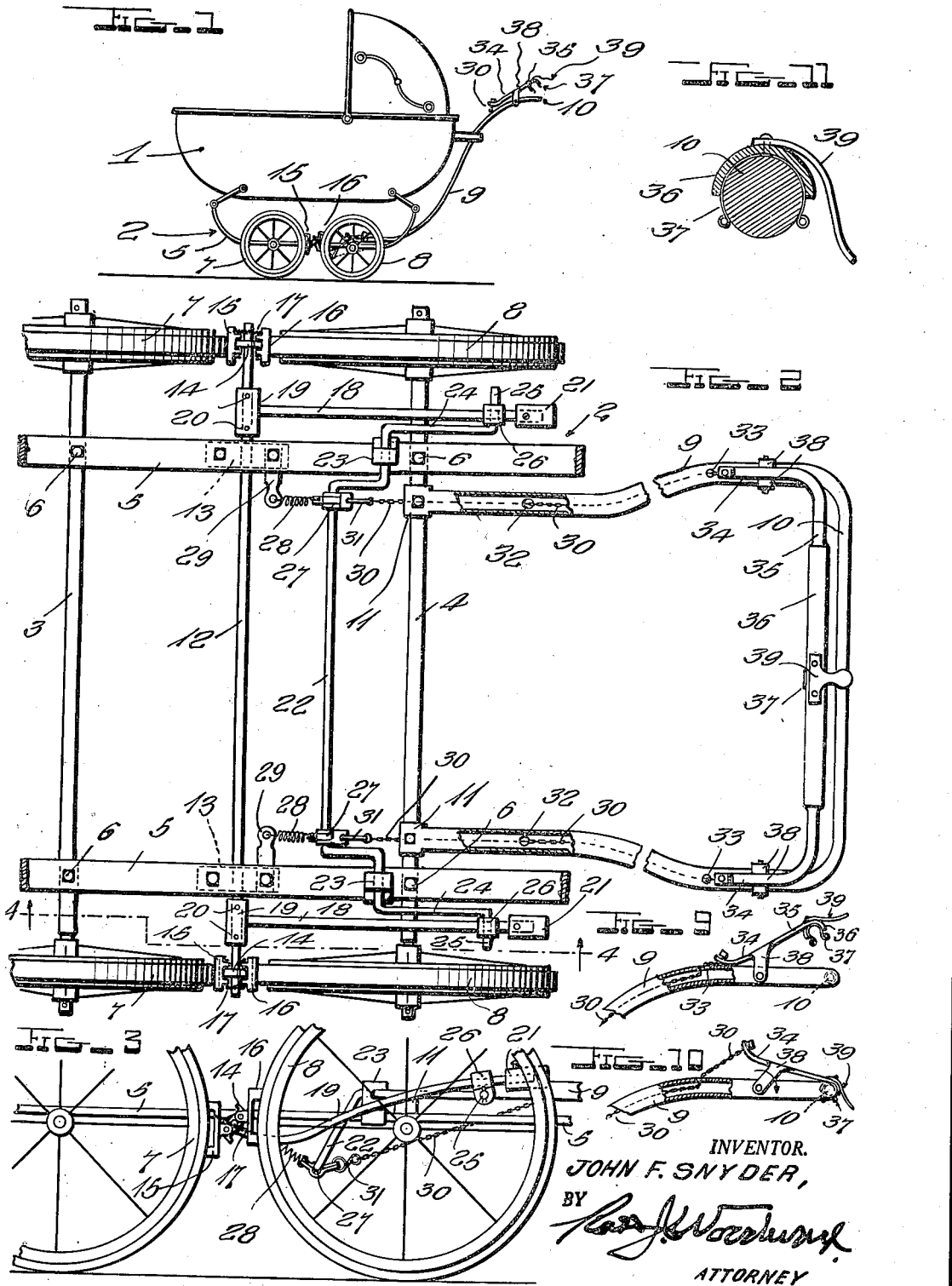
INVENTOR.
JOHN F. SNYDER,
BY
ATTORNEY

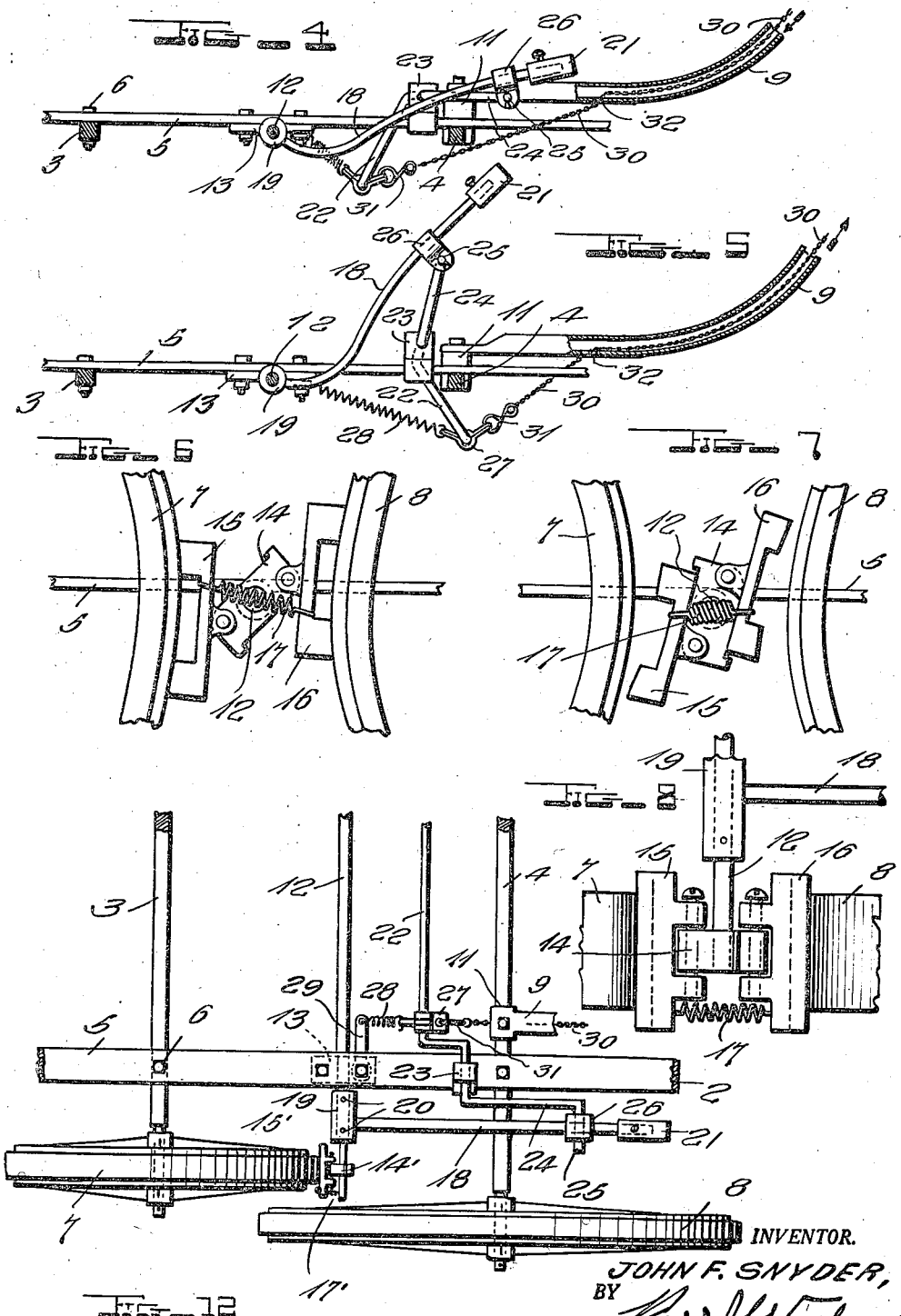

Patented Sept. 2, 1941

2,254,786

UNITED STATES PATENT OFFICE 2,254,786

AUTOMATIC SAFETY BRAKE FOR BABY CARRIAGES

John F. Snyder, New York, N. Y.

Application April 5, 1941, Serial No. 387,076

5 Claims. (Cl. 188—20)

This invention relates to baby carriage brakes and it is one object of the invention to provide a brake which is particularly adapted for use in connection with baby carriages as it normally remains in applied position and will automatically return to applied or operative position as soon as a person releases hold upon the cross bar of the handle of the carriage. It will thus be seen that there will be no danger of the carriage coasting down a hill or other sloping surface due to a person forgetting to apply the brake and, also, the carriage will be prevented from coasting down hill if the handle bar slips from a person's grasp, and injury to a baby thus eliminated.

Another object of the invention is to provide a brake structure which is adaptable to either a carriage of the basket type or the stroller type, and may be easily applied to a carriage of conventional construction either during manufacture thereof or as a replacement for brakes already applied to the carriage.

Another object of the invention is to provide a brake wherein the brake shoes are so mounted that when they are moved toward the front and rear wheels of a carriage they will have sufficient give to permit both the front shoes and the rear shoes to have braking engagement with the wheels.

Another object of the invention is to provide brakes which are simple in construction, efficient in operation and not likely to get out of order.

In the accompanying drawings:

Fig. 1 is a side elevation of a carriage equipped with brakes of the improved construction.

Fig. 2 is a top plan view of the chassis with the improved brakes mounted thereon.

Fig. 3 is a fragmentary view in side elevation showing the brakes in operative position.

Fig. 4 is a fragmentary sectional view on the line 4—4 of Fig. 2, showing the brake mechanism in normal brake-applying position.

Fig. 5 is a view similar to Fig. 4, showing the brake mechanism moved to brake-releasing position.

Fig. 6 is a fragmentary view in elevation showing the brakes applied to the front and rear wheels.

Fig. 7 is a view similar to Fig. 6, showing the brakes released.

Fig. 8 is a top plan view of Fig. 6.

Fig. 9 is a fragmentary view of the carriage handle with the brake releasing lever or yoke in the position assumed when the brakes are applied.

Fig. 10 is a view similar to Fig. 9, showing the lever or yoke moved to the brake releasing position.

Fig. 11 is a sectional view through the handle bar and the brake releasing yoke or lever in its brake-releasing position.

Fig. 12 is a fragmentary view in top plan, of a brake mechanism having shoes for applying braking force to only one pair of wheels.

This improved brake mechanism is for use on baby carriages of conventional construction having a body 1 and an undercarriage 2, and while the body shown in Fig. 1 is of the basket type, it will be understood that it may be of the stroller type. The undercarriage includes front and rear axles 3 and 4 to which springs 5 are secured by bolts or equivalent fasteners 6, the springs having upwardly turned ends for connecting with front and rear portions of the body. Front and rear wheels 7 and 8 are mounted at the ends of the axles. There has also been provided the usual handle 9 which is formed of metal tubing and is bent to form a handle bar 10 having arms extending forwardly thereof and having their front ends fixed to the rear axle, as shown at 11. It will be understood that, if desired, the handle bar 10 may be formed separate from the tubular side arms and either be of tubular or solid formation.

The brake bar 12 extends transversely of the chassis and is rotatably mounted through bearings 13 carried by the springs 5 with its end portions projecting outwardly from the springs between the wheels 7 and 8 and carrying blocks 14 to which brake shoes 15 and 16 are pivoted, the shoes 15 being disposed forwardly for engaging the front wheels 7 and the shoes 16 rearwardly for engaging the rear wheels 8. Helical springs 17, which extend between the shoes and are anchored thereto, normally hold the shoes in close contacting engagement with front and rear edge faces of the blocks, as shown in Fig. 7, but when the brake shaft is turned in its bearings to shift the shoes toward the wheels 7 and 8, the springs permit the shoes to have tilting movement independently of each other. Therefore, if the shoes do not simultaneously make contact with the wheels, one may continue its movement toward the companion wheel after the other has made contact with the wheel companion thereto, and the shoes finally have braking engagement with both wheels, as shown in Fig. 6. When the brake shaft turns in a direction to release the brakes, the springs contract and the shoes will be returned to their normal position shown in Fig. 7.

In a carriage of the stroller type, wherein the rear wheels are larger than the front wheels and have their forward portions overlapping rear portions of the front wheels, as shown in Fig. 12, the brake shaft terminates in spaced relation to inner sides of the rear wheels while extending across the front wheels. In such a carriage each end of the brake shaft carries a block 14' and each block 14' carries a single brake shoe 15' which is yieldably held against the forward edge face of the block by a spring 17' which moves the shoe into braking engagement with the companion front wheel when the brake shaft is turned in its bearings in a brake applying direction.

In order to rotate the brake shaft in a direction to move the blocks out of normal position, in which the brakes are applied, to adjusted position in which the brakes are released, there have been provided levers having sleeves 19 at their forward or inner ends which fit about the brake shaft and are fixed thereto by pins or equivalent fasteners 20. Weights 21, carried by rear ends of the levers, urge the levers downwardly for rotating the brake shaft for normally holding the brakes in applied position. These levers must be swung upwardly in order to turn the brake shaft in a direction to release the brakes and to accomplish this there has been provided a crank shaft 22 which is journaled through bearings 23 carried by the springs 5 and has rearwardly extending arms 24 terminating in outstanding laterally extending fingers 25 which are pivotally engaged through shackles 26 loosely carried by the levers 18 and slidable along the same during swinging movement of the levers. Shackles 27 are carried by the crank shaft and springs 28 have their rear ends connected with the shackles and their front ends anchored to plates or brackets 29 which extend inwardly from the springs 5. These springs exert pull on the crank shaft and normally hold it in the position shown in Figs. 3 and 4 with the levers 18 swung downwardly and the brakes applied as shown in Figs. 3 and 6.

When rearward pull is exerted on the crank shaft to swing its arms upwardly to the position shown in Fig. 5, the levers 18 will be shifted upwardly and the brake shaft turned in a brake-releasing direction and the blocks and brake shoes carried thereby will be moved to the position of Fig. 7, in which the brakes are inoperative and the carriage may be easily propelled. Rearward pull on the crank shaft is accomplished by chains 30 which have their front ends connected with the shackles 27 by links 31. These chains extend in a rearward direction and enter the tubular side arms of the handle 9 through openings 32 formed therein, openings 33 being formed in the side arms of the handle so that rear portions of the chains may pass outwardly, as shown in Figs. 2, 9 and 10, for engagement with forward ends of the side arms 34 of a brake-releasing yoke or lever 35. The intermediate portion 36 of the yoke is of channel formation so that when the yoke is swung downwardly, it may fit upon the handle bar 10 and this portion of the yoke carries a clip 37 of thin resilient metal for yieldably gripping the handle bar. Bearing brackets 38, which extend downwardly from the side arms of the yoke and are pivotally connected with the side arms of the handle 9, pivotally mount the yoke for rocking movement and, when the yoke is grasped by its portion 36 and pressed downwardly into engagement with the handle bar 10, the front ends of the side arms 34 will be swung upwardly and pull exerted on the chains to draw upon the crank shaft and effect movement of the brakes to a released or inoperative position. The clip 37 tends to hold the yoke in brake-releasing position but is not strong enough to prevent pull of the springs 28 returning the brakes to operative position when the yoke is released. It will thus be seen that whenever a person having charge of a baby carriage releases grip on the handle bar and the portion 36 of the yoke 35, the brakes will be immediately applied and there will be no danger of the carriage coasting downgrade, due to failure to remember to apply the brakes. A tab 39 formed of leather is carried by the yoke for use when operating the yoke, if desired.

Having thus described the invention, what is claimed is:

1. In combination with a baby carriage having a chassis including side members, front and rear axles carried thereby, wheels carried by the axles, and a handle having a handle bar and side bars; a brake shaft extending transversely of the chassis and rotatably mounted with its end portions projecting outwardly from the side members, blocks carried by ends of said brake shaft, brake shoes pivotally carried by said blocks for movement from contacting engagement with opposite faces of the blocks to extended position for gripping engagement with the companion wheels, springs yieldably holding said shoes against the blocks, levers carried by the brake shaft in a direction and serving to rotate the brake shaft to apply the brakes, and means for swinging the levers in an opposite direction and effecting movement of the brakes to inoperative position including an operating member carried by the handle bar.

2. In combination with a baby carriage having a chassis including side members, axles, front and rear wheels carried by the axles, and a handle having a handle bar and tubular side bars; a brake shaft extending transversely of the chassis and rotatably supported across the side members with end portions extending therefrom between the front and rear wheels, brakes carried by end portions of the brake shaft, levers carried by the brake shaft and extending rearwardly therefrom in position to swing downwardly for rotating the brake shaft in a direction for applying the brakes to companion wheels, a crank shaft carried by the side members and having arms at its ends connected with the lever for swinging the levers upwardly and turning the brake shaft in a direction to release the brakes, an actuating member pivotally carried by the handle in position to be grasped by the hand of a person gripping the handle bar to propel the carriage, chains extending through the side bars of the handle and connected at its ends to the crank shaft and the actuating member, and springs yieldably holding the crank shaft in normal position with the brakes applied.

3. In combination with a baby carriage having a chassis including side members, axles, wheels carried by the axles, and a handle having a handle bar and tubular side bars; a brake shaft extending transversely of the chassis and rotatably supported across the side members with end portions extending therefrom, brakes carried by end portions of the brake shaft, levers carried by the brake shaft and extending rearwardly therefrom in position to swing downwardly for rotating the brake shaft in a direction for applying the brakes to companion wheels, and means for swinging the levers upwardly and turning the brake shaft in a direction to release the brakes comprising a crank shaft extending transversely of the chassis and rotatably mounted across said side members and provided with side arms having outstanding fingers, shackles slidable along said levers and pivoted to the fingers and connecting the side arms of the crank shaft with the levers to swing the levers upwardly and turn the brake shaft in a brake-applying direction when the crank of the crank shaft is drawn rearwardly, spring means for yieldably resisting rearward movement of the crank of the crank shaft, and means for effecting rearward movement of the crank including an actuating member carried by the handle in position to be grasped by a hand grasping the handle bar of the handle.

4. In combination with a baby carriage having a chassis including side members, axles, wheels carried by the axles, and a handle having a handle bar and tubular side bars; a brake shaft extending transversely of the chassis and rotatably supported across the side members with end portions extending therefrom, brakes carried by end portions of the brake shaft, levers carried by the brake shaft and extending rearwardly therefrom in position to swing downwardly for rotating the brake shaft in a direction for applying the brakes to companion wheels, and means for swinging the levers upward and turning the brake shaft in a direction to release the brakes comprising a crank shaft extending transversely of the chassis and rotatably mounted across said side members and provided with side arms having outstanding fingers, shackles slidable along said levers and pivoted to the fingers and connecting the side arms of the crank shaft with the levers to swing the levers upwardly and turn the brake shaft in a brake-applying direction when the crank of the crank shaft is drawn rearwardly, spring means for yieldably resisting rearward movement of the crank of the crank shaft, collars carried by the crank of the crank shaft, brackets carried by the side members, springs mounted between the brackets and collars for extending pull on the collars and resisting rearward swinging of the crank and yieldably holding the crank shaft in normal position with the brakes applied, a yoke over the handle having forwardly extending side arms pivoted to side arms of the handle and a cross bar disposed over the handle bar of the carriage handle, lines extending longitudinally through the side arms of the carriage handle with their forward portions extending therefrom and connected with said collars, rear ends of the lines passing out of the side arms of the carriage handle and connected with forward ends of the said arms of the yoke whereby depression of the cross bar of the yoke onto the handle bar of the carriage handle will exert pull on the lines and swing the crank of the crank shaft rearwardly and turn the crank in a direction to swing its arms upwardly to turn the brake shaft in a direction to move the brakes to releasing position, and a resilient clip carried by the cross bar of the yoke for gripping the handle bar of the carriage handle when the yoke is tilted to brake-releasing position.

5. In combination with a baby carriage having a chassis including side members, front and rear wheels, and a handle having a handle bar; a brake shaft extending transversely of the chassis and rotatably mounted with its end portions extending between the front and rear wheels, blocks carried by ends of said brake shaft, brake shoes pivotally carried by ends of said blocks for tilting movement from retracted inoperative position in contacting engagement with front and rear faces of the blocks to extended position for gripping engagement with the front and rear wheels, spring means yieldably holding the shoes in retracted position, levers carried by the brake shaft and serving to rotate the brake shaft in a direction to apply the brakes, and means for swinging the levers in an opposite direction and effecting movement of the brakes to inoperative position including an operating member disposed in position to be actuated by a hand grasping the handle bar.

JOHN F. SNYDER.